May 24, 1966  A. R. KRASBERG  3,252,458
OXYGEN SENSING AND CONTROL DEVICE FOR A BREATHING APPARATUS
Filed Feb. 16, 1965  5 Sheets-Sheet 1

May 24, 1966  A. R. KRASBERG  3,252,458
OXYGEN SENSING AND CONTROL DEVICE FOR A BREATHING APPARATUS
Filed Feb. 16, 1965  5 Sheets-Sheet 4

Inventor
Alan R. Krasberg
By: Olson, Trexler, Wolters & Bushnell attys.

Fig. 10.

Inventor
Alan R. Krasberg
By Olson, Trexler, Wolters & Bushnell
attys

United States Patent Office 3,252,458
Patented May 24, 1966

3,252,458
OXYGEN SENSING AND CONTROL DEVICE FOR A BREATHING APPARATUS
Alan R. Krasberg, Glenview, Ill.
(% J. H. Emerson Co., Cambridge, Mass.)
Filed Feb. 16, 1965, Ser. No. 433,113
15 Claims. (Cl. 128—142)

This application is a continuation-in-part of my co-pending application Serial No. 234,781, filed November 1, 1962, and now abandoned.

The present invention relates to a novel apparatus for maintaining a predetermined gas or breathable fluid mixture or atmosphere, and more specifically to a novel apparatus for maintaining and controlling desired amounts of oxygen in a gas or fluid which is to be breathed.

As will become apparent, certain features of the present invention may be adapted for maintaining or controlling desired gas mixtures in various types of systems, rooms, chambers or breathing apparatus for life support in, for example, underwater living quarters, decompression chambers, space capsules, airplane cabins, hyperbaric operating chambers, baby incubators, oxygen tents, underwater breathing apparatus and the like. Features of the invention are especially suitable for use in breathing apparatus of the type generally designated as self-contained underwater breathing apparatus. In order to facilitate the disclosure of the present invention such an underwater breathing apparatus will be described, but it is to be understood that other types of systems or apparatus are contemplated as previously indicated.

As is well known, several types of self-contained underwater breathing apparatus or scuba equipment have heretofore been proposed. In one type of such equipment each breath is entirely exhaled into the water so that a high percentage of the air or gas being breathed is wasted. Another type of such apparatus contemplates that a portion of each breath will be recirculated and supplemented by fresh air or oxygen while another portion will be exhaled into the water. Such a semi-closed system still is relatively inefficient in that a large percentage of the available gas is wasted and, in addition, difficulties have been encountered in assuring that a sufficient amount of new oxygen is introduced into the circulating gas to assure the safety of the diver. Still another type of breathing system contemplates the recirculation of all of the gas which is breathed with the removal of carbon dioxide therefrom and the addition of new oxygen thereto. Such fully closed recirculating systems heretofore proposed have generally been relatively complicated, expensive and bulky and frequently unreliable or have used pure oxygen so as to provide severe limitations as to depth and length of a dive as a result of possible oxygen toxicity.

An object of the present invention is to provide a novel, efficient and reliable apparatus for controlling a respirable gas mixture.

A further important object of the present invention is to provide a novel apparatus of the completely closed circulating type for maintaining a desired gas mixture, which apparatus is relatively simple and compact and which is completely reliable.

As is well known, air or other gas mixtures which are suitable for breathing at normal or sea level pressures may not be suitable under relatively high pressure such as occur when a diver descends to a considerable depth beneath the surface of the water. Therefore, it is an important object of the present invention to provide a novel breathing apparatus which is capable of adjusting the amount of oxygen in the gas being breathed in accordance with the depth or pressure at which a diver is located, and more specifically it is an object of the present invention to provide a novel system or breathing apparatus having means monitoring the oxygen in accordance with the oxygen tension or partial pressure in a fluid or gas mixture.

A further object of the present invention is to provide a novel breathing apparatus which is constructed for enabling a diver to adjust the amount of oxygen being supplied for any desired reason such as for increasing the amount of oxygen during an ascent and thereby reducing the time normally required by a diver for decompression purposes.

Other objects and advantages of the present invention will become apparent from the following description and the accompanying drawings wherein;

Figure 1:
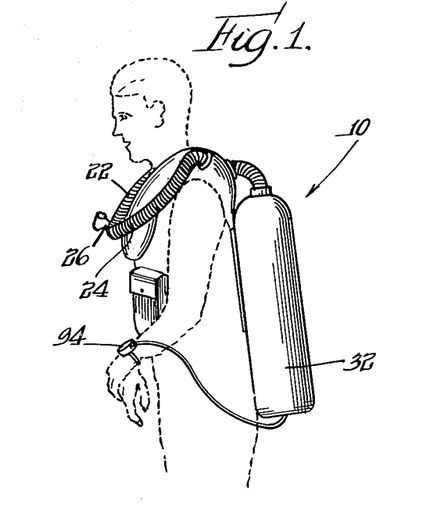
FIG. 1 is a side view showing an apparatus incorporating features of the present invention mounted on a diver.
Figure 2:
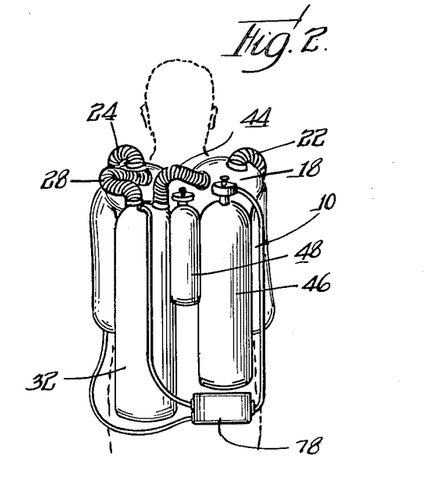
FIG. 2 is a back view of the apparatus.
Figures 4, 5, 6:
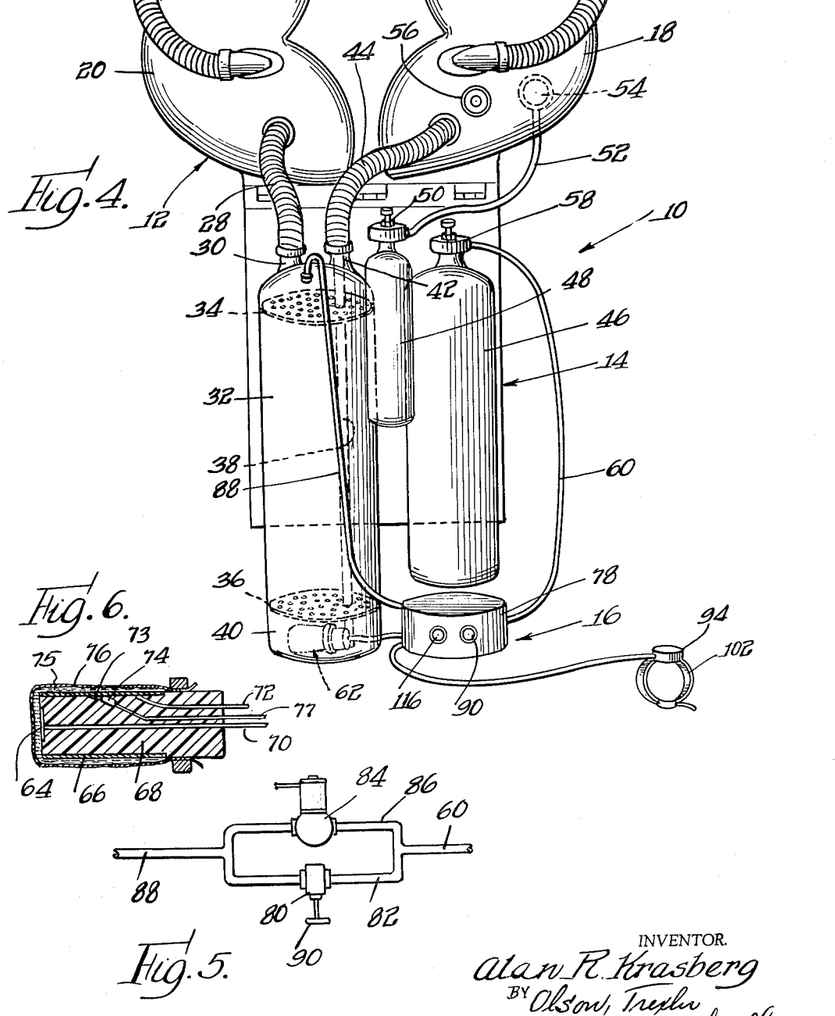
FIG. 4 is an enlarged view of applicant's apparatus.
FIG. 5 is an enlarged partially schematic view showing a portion of the oxygen control system.
FIG. 6 is a sectional view showing an oxygen sensing device used in an apparatus of the present invention.

Referring now more specifically to the drawings wherein like parts are designated by the same numerals throughout the various figures, an apparatus 10 incorporating features of the present invention is shown in FIGS. 1, 2 and 4. In general, the apparatus comprises means 12 providing a passageway or circuit through which gas to be breathed may be circulated, means 14 for providing a supply of oxygen and other gas, and means 16 for controlling the flow of fresh oxygen to the circuit providing means 12.

The gas circuit providing means 12 comprises inflatable and collapsible breathing bags 18 and 20 which may be shaped so as to fit over the shoulders of a diver as shown in FIGS. 1, 2 and 4. Flexible hoses 22 and 24 are respectively connected with the breathing bags 18 and 20 and with a mouthpiece and breathing or check valve assembly 26 shown in FIG. 1. The mouthpiece and check valve assembly 26 is of known construction and therefore need not be described in detail. It suffices to state that the assembly 26 includes check valves for permitting gas to be inhaled by a diver from the bag 18 through the hose 22 and to be exhaled by the diver through the hose 24 and into the bag 20.

The exhaust bag 20 is connected by means of a conduit or hose 28 with an inlet 30 of a tank or canister 32 which contains a material which is adapted to absorb the carbon dioxide in the gas which has been exhaled or exhausted by the diver. Any suitable known absorbent material may be used such as that now sold under the trademark "Baralyme," and the absorbent material is disposed in the canister between upper and lower screens 34 and 36. The canister is provided with an outlet pipe 38 which extends from a chamber 40 beneath the lower screen 36 to an outlet fitting 42. This fitting is connected by means of a conduit or hose 44 with the breathing bag 18 in order to complete the circuit for the recirculation of gas being breathed by the diver.

The gas supply means 14 comprises a first tank 46 adapted to contain a supply of oxygen under pressure and a second tank 48 adapted to contain a supply of a neutral gas such as nitrogen or helium or any other suitable gas under pressure. It is contemplated that the neutral gas, once admitted to the circuit means 12, will be continuously recirculated so that the tank 48 may be relatively small. However, the oxygen tank 46 should be relatively large since a portion of the oxygen is used up with each breath of the diver.

A shutoff and pressure regulating valve 50 is connected with the outlet end of the tank 48, which valve may be of known construction and need not be described in detail. As will be understood, the gas within the tank 48 will initially be at a relatively high pressure and the valve 50 is designed to reduce this pressure to a predetermined value. An outlet of the pressure reducing and shutoff valve 50 is connected by means of a tube or hose 52 with a pressure actuated demand valve 54 which in turn communicates with the interior of the breathing bag 19. The valve 54 may also be of known construction. It will be appreciated that various available structures may be used for the valve 54 so that it suffices to state that the valve is constructed for admitting gas to the bag 18 in a manner for maintaining the bag in a desired substantially fully inflated condition. More specifically, as will be appreciated, when a diver descends the increasing water pressure tends to collapse the breathing bags, and the valve structure 54 is constructed for admitting additional gas into the bag 18 for equalizing the water pressure whenever the bag 18 tends to collapse more than a predetermined amount.

In addition to the demand inlet valve 54, an exhaust valve 56 is mounted in a wall of the bag 18. The valve 56 may also be of known construction and therefore need not be described in detail. It suffices to state that the valve 56 is constructed so that while the diver is descending or maintains his position at approximately the same water level the valve 56 remains closed. However, when the diver ascends, the exhaust valve 56 functions to permit sufficient gas to escape from the circuit means 12 to prevent the breathing bag from unduly expanding and bursting.

The oxygen tank is provided with a combined shutoff and pressure reducing valve 58 connected with its outlet port, which valve is similar to the valve 50 associated with the tank 48 and is also of known construction so that it need not be described in detail. The pressure reducing valve 58 has its outlet connected by means of conduit 60 with the oxygen control means 16.

In accordance with a feature of the present invention, the oxygen sensing and control means 16 is constructed and arranged for sensing the presence of oxygen in the gas mixture which is to be breathed by the diver and for admitting additional oxygen from the tank 46 into the circuit means 12 in accordance with the needs of the diver. More specifically, in accordance with the present invention the sensing and control means 16 is adapted to sense the presence of oxygen in accordance with the partial gas pressure in the gas mixture resulting from the oxygen therein whereby a diver can be assured of receiving sufficient oxygen to prevent anoxia and at the same time the diver may be assured that the concentration of oxygen will be insufficient to cause oxygen toxicity.

Figure 3:
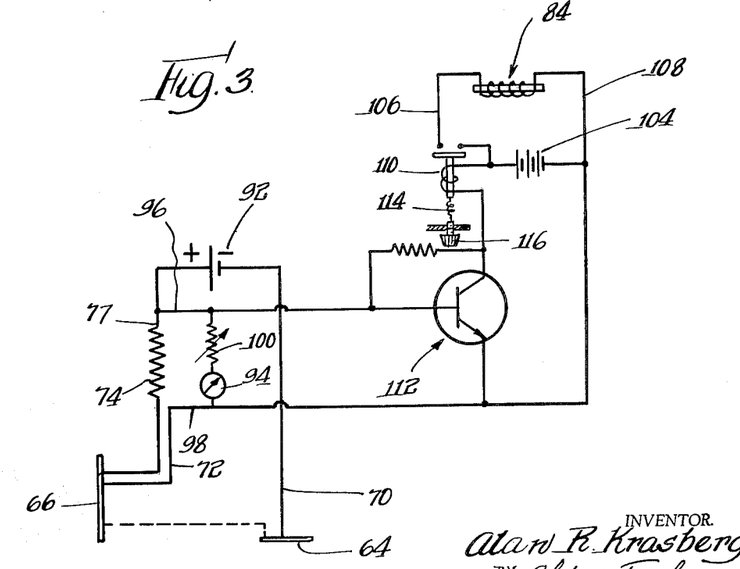
FIG. 3 is a schematic wiring diagram showing a portion of the oxygen sensing and control means constructed in accordance with a feature of the present invention.

The control means 16 comprises a device 62 shown in FIG. 6 and schematically in FIG. 3 for sensing the presence of oxygen in the gas flowing through the circuit means 12. In the embodiment shown, the sensing device 62 is located in the circuit means 12 downstream from the carbon dioxide absorbing material in the canister for sensing the oxygen content of the gas mixture which is to be substantially directly breathed by the diver. As indicated in FIG. 4, the sensing device 62 may conveniently be located in the lower end chamber of the canister adjacent the outlet conduit 38.

The sensing device 62 is adapted to respond to the presence of oxygen in the gas mixture in accordance with the partial gas pressure resulting from the oxygen. More specifically, the sensing device comprises an electrochemical cell constructed for obtaining an oxidation action proportional to the oxygen to which the device is exposed and for providing an electrical signal proportional to the oxidation action or, in other words, proportional to the amount of oxygen to which the device is exposed. The electrochemical cell 62 further has the characteristic of providing an electrical signal which is proportional to the rate at which oxygen is supplied to the reactive portion of the cell. In this embodiment the device 62 comprises a polarographic oxygen electrode, or cell, adapted to provide a flow of electricity in response to the presence of oxygen.

Referring particularly to FIG. 6, it is seen that the device 62 comprises a first electrode or cathode 64 which, in this embodiment, may be made from platinum, and a second cylindrical electrode or anode 66 formed from silver and having a coating of silver oxide. The electrode 64 is disposed at the end of a body 68 formed of plastic or other suitable electrical insulating material and the electrode 66 is mounted around the body in slightly spaced relationship with respect to the electrode 64. Wire leads 70 and 72 are connected with and extend from the electrodes 64 and 66 respectively for connection in an electrical circuit described below. A temperature compensating thermistor 74 having leads 73 and 77 is preferably connected in circuit and disposed so as to be subjected to the same temperatures as the electrodes.

An end portion of the body 68 including the electrodes 64 and 66 is coated with an electrolyte 75 which, in the specific embodiment disclosed herein, is preferably a potassium hydroxide solution. The electrolyte is trapped and retained within a thin membrane 76 formed from a suitable material, preferably polyethylene, which is adapted to permit oxygen to diffuse therethrough while resisting the passage of other fluids. With this construction, oxygen in the gas mixture in the lower end chamber 40 of the canister will pass through the membrane and come into contact with the electrode 64 in accordance with the oxygen tension or partial pressure.

When the sensing device or cell 62 is connected in a circuit so that the electrodes 64 and 66 are respectively negatively and positively charged, oxygen contacting the platinum electrode 64 is reduced to hydroxyl and the resulting OH ions diffuse to the silver reference electrode and react with the silver to form silver oxide. Since the amount of oxygen coming into contact with the electrode 64 controls the flow of current between the electrodes 64 and 66 and depends on the oxygen tension or partial pressure in the gas mixture which forces the oxygen through the membrane, it is apparent that the aforementioned current will be proportional to the oxygen tension or partial pressure in the gas mixture which is to be breathed by the diver.

As shown in FIG. 5, the oxygen control means 16 includes a valve structure adapted to be housed within a suitable water-proof container 78 along with electrical circuitry described below for controlling the flow of oxygen from the supply tank into the circuit means 12. The valve structure comprises a constantly open adjustable valve 80 connected in a first branch conduit 82 which in turn is connected with the conduit 60, and a second normally closed solenoid actuated valve 84 connected in a second branch conduit 86 which in turn is connected with the conduit 60. The branch conduits 82 and 86 are also connected with a conduit or hose 88 which extends from the container 78 and is connected with the canister 32, preferably at the upper end of the canister.

The opening or orifice of the valve 80 is adapted to be adjusted by means of a hand knob 90 projecting from the side of the container 78 so as to permit a predetermined minimum constant flow of oxygen from the supply tank and into the circuit means 12. The minimum flow to which the valve 80 is adjusted should be sufficient to provide a minimum amount of oxygen to assure survival of the diver but would normally be significantly less than the desired optimum oxygen flow. The desired optimum flow of oxygen is obtained by opening the solenoid operated valve 84 in response to the current flow provided by the oxygen sensing device 62. Thus, one important function of the constantly open valve 80 is to provide a safety device in the event of a failure of the valve 84 and in certain instances the valve 80 could be eliminated. However, the constantly open valve 80 is preferably provided since in addition to the safety factor provided thereby, there will also be a substantial reduction in the time during which the solenoid valve 84 is energized whereby the drain on the batteries providing the power supply for the control circuit will be minimized.

A suitable electrical circuit for the control means 16 is schematically shown in FIG. 3. A battery 92 is connected between the leads 70 and 77 of the sensing device 62. In order to provide the diver with a visual indication of the oxygen content of the gas mixture to be breathed, a meter 94 is connected by wires 96 and 98 with the lead 72 and in parallel with the thermistor 74. A variable resistor 100 is connected in series with the meter 94 for enabling the meter to be properly calibrated. As indicated in FIGS. 1 and 4, the meter 94 may be attached to a wristband or strap 102 so that it may be worn on the wrist of the diver.

In order to actuate the solenoid valve 84, a battery 104 is connected by wires 106 and 108 in series with the solenoid valve and with an adjustable normally closed relay 110. The relay is controlled in response to a signal received from the oxygen sensing device 62 which is amplified by a transistorized amplifier 112. The relay may be of known construction of a type which is adjustable so that the current flow at which the relay will open and close may be varied. For example, the tension in a spring 114 which serves to urge the relay to a closed position may be adjusted by turning a hand knob 116. Preferably the hand knob 116 projects from the side of the container 78 in order to facilitate adjustment of the system.

When making a dive with the aid of the above described apparatus, the diver first adjusts the valve 80 to provide the predetermined minimum oxygen flow and adjusts the relay 110 for opening the valve 84 in order to maintain a predetermined amount of oxygen or oxygen tension within the circuit means 12. It is to be noted that as the diver descends, gas must be supplied to the circuit means 12 from the tanks 46 and 48 in order to equalize the increasing water pressure around the diver. The control system which responds to the oxygen tension or partial pressure as described above, functions to maintain the molecule weight of oxygen within the circuit means 12 relatively constant during the diver's descent so that the oxygen tension remains relatively constant and the great majority of the gas required to equalize the water pressure is supplied from the tank 48. Thus as the diver descends, the percentages of the gases in the mixture flowing through the circuit means 12 change with the percentage of oxygen decreasing, but at the same time the actual amount of oxygen within the circuit means 12 is maintained relatively constant. This features enables a diver to dive deeper and longer without being subject to oxygen toxicity.

As indicated above, the oxygen control means 16 functions for varying the percentage of oxygen in the gas mixture with the depth of the diver while maintaining the amount of oxygen breathed by the diver with each breath relatively constant. It is further contemplated that the diver may manually adjust the amount of oxygen within the circuit means 12 for any desired reason. For example, in order to shorten the time usually required for a diver for decompression during an ascent, it is desirable to increase the amount of oxygen in the gas mixture being breathed. With the system described herein this adjustment in the amount of oxygen may be readily accomplished by adjusting the valve 80 and/or by adjusting the relay 110 which controls the solenoid valve 84. Such manual adjustments may be easily and properly made by the diver since the meter 94 provides the diver with a visual indication of the amount of oxygen present in the gas mixture. It is thus apparent that the present system is capable of not only maintaining the desired amount of oxygen in the gas mixture as a diver varies his depth under the water, but the system is also capable of being manually adjusted during the dive in order to satisfy any special requirements.

FIGS. 7 through 10 show a modification of a diving apparatus incorporating features of the present invention which is similar to the structure described above as indicated by the application of identical reference numerals with the suffix $a$ added to corresponding elements.

Figure 7:
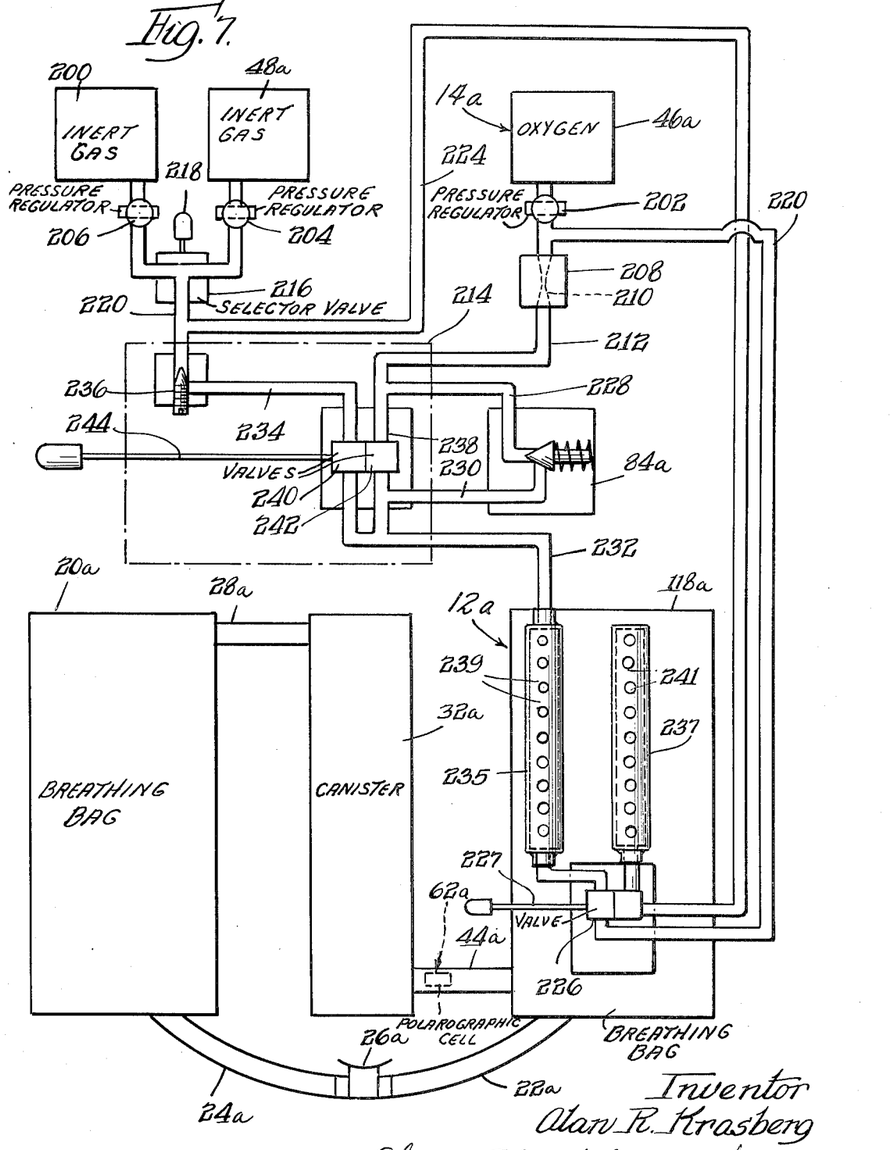
FIG. 7 is a schematic view showing a modified form of the present invention.
Figure 8:
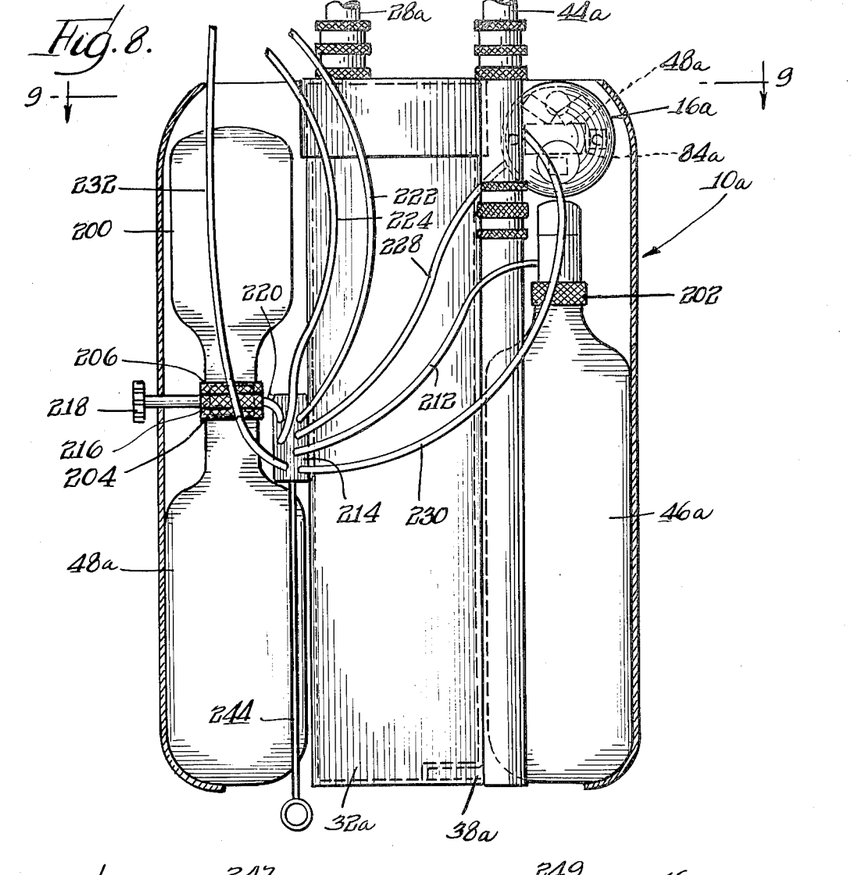
FIG. 8 is an elevational view showing a unit incorporating the features of FIG. 7 and adapted to be worn on the back of a diver.
Figure 9:
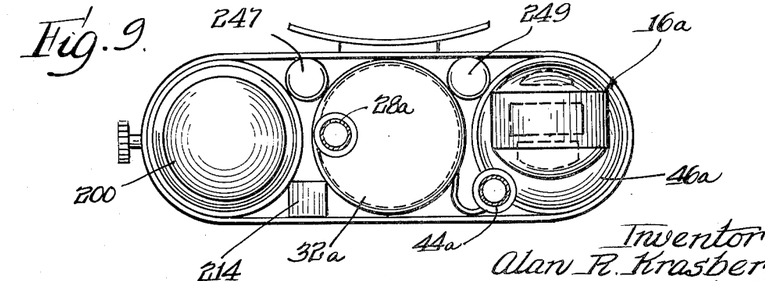
FIG. 9 is a sectional view taken along line 9—9 in FIG. 8.

Referring particularly to FIGS. 7, 8, and 9, it is seen that the apparatus 10a comprises a gas circuit or system 12a including the flexible breathing bag 18a and 20a connected by tubes 22a and 24a with means communicative with a person who is to breathe the gas mixture, which means may be a mouthpiece 26a of known construction or other suitable means. The breathing bags 18a and 20a are also connected with a canister 32a by suitable conduits 28a and 44a.

The means 14a or portion of the circuit for supplying oxygen and other gases comprises not only cylinders 46a and 48a respectively for containing oxygen and an inert gas such as nitrogen or even compressed air, but also a cylinder 200 for containing another inert gas such as helium. As is well known, nitrogen may provide a dangerous reaction in a diver at relatively great depths, which reaction may be prevented by utilizing an inert gas such as helium rather than nitrogen. Furthermore, decompression times for a diver may be significantly shortened by switching from one inert gas to another during the ascent.

As indicated in FIGS. 7 and 8 pressure regulators 202, 204 and 206 are connected with the cylinders or gas bottles 46a, 48a and 200 respectively. A fitting 208 having a flow restricting orifice 210 is connected with the outlet of the pressure regulator 202, which fitting is connected by a tube 212 with a valve unit 214 described more in detail below. The inert gas cylinders or bottles 48a and 200 are disposed in opposing relationship and the outlets of their respective pressure regulators 204 and 206 are connected with a selector valve unit 216 therebetween. The valve unit 216 has an operating handle 218 positioned so that the diver may manipulate the valve alternately to direct gas into the circuit or system from the bottles 48a or the bottle 200. The selector valve unit 216 is connected by a conduit or tube 220 with the valve unit 214.

The valve unit 214 includes ports respectively in direct communication with the oxygen inlet tube 212 and the inert gas inlet tube 220. These ports are respectively connected by tubes or conduits 222 and 224 with a manually operable shutoff valve 226 associated with the breathing bag 18a, and adapted to be operated to open either the tube 222 or the tube 224. As will be described more in detail below, the valve 226 is normally closed but may be manually operated by shifting lever 227 selectively in opposite directions to permit either the oxygen or the inert gas to by-pass the automatic control valve and enter the bag.

The apparatus 10a has control means 16a including a solenoid valve 84a. The valve has an inlet connected by tube 228 with a port of the valve unit 214 communicating directly with the oxygen inlet tube 212. The valve 84a has an outlet connected by tube or conduit 230 with the valve unit 214. This tube is in turn connected with a port within the valve 214 which port communicates with a tube 232 which extends to the breathing bag 18a.

The valve unit 214 has internal passages shown schematically in FIG. 7. One of these passageways designated by the numeral 234 connects with the inlet inert gas tube or conduit 220 through a needle valve 236 or an adjustable orifice, which needle valve is adapted to control the rate of flow of the inert gas into the passageway 234 when the valve unit 214 is manipulated in a manner described below. Another passageway 238 communicates with the inlet oxygen conduit or tube 212. The passageways 234 and 238 are normally closed or blocked by valve elements 240 and 242 respectively, but when these valve elements are opened, the passageways 234 and 238 communicate with the tube 232 which extends to the breathing bag 18a.

During normal operation, inert gas is manually supplied by operating the valve 225 either from the container or bottle 48a or 200 through the tube 224 to the bag 18a and oxygen is automatically supplied to the bag 18a through the control valve 84a. In the event of a failure in the control valve 84a or other emergency, a gas mixture of oxygen and inert gas may be continuously supplied to the bag 18a by manipulating an actuating member or pull rod 244 connected with the valve elements 240 and 242 for opening the passageways 234 and 238. When the emergency valve unit 214 is thus opened, oxygen flows directly from the passageway 238 to the tube 232 and by-passes the control valve 84a and at the same time the inert gas flows directly from the passageway 234 to the tube 232. The flow of the inert gas is adjusted by the needle valve 236 so that it is related to the flow of oxygen through the restricted orifice 208 in a manner for providing a gas mixture which is suitable for maintaining life and thus suitable for emergency purposes.

As shown in FIG. 7, the conduits or tubing extending from both the oxygen supply and the inert gas supply enter the breathing bag 18a and communicate with tubes 235 and 237 within the breathing bag. These tubes are respectively provided with a plurality of small axially spaced apertures 239 and 241 spaced along their lengths. As a result, the gases entering the breathing bag 18a through the tubes 235 and 237 are divided up into a plurality of small streams or jets as they flow through the apertures 239 and 241. This results in a mixing action of the gases within the breathing bag and substantially eliminates any tendency for the separate gases to circulate through the system without being properly mixed with each other. In a diving apparatus of the type disclosed herein, the tubes 235 and 237 are preferably in the form of small flexible tubes of rubber, flexible plastic or the like although it is understood that in certain installations the tubes may be made of rigid material.

Figure 10:
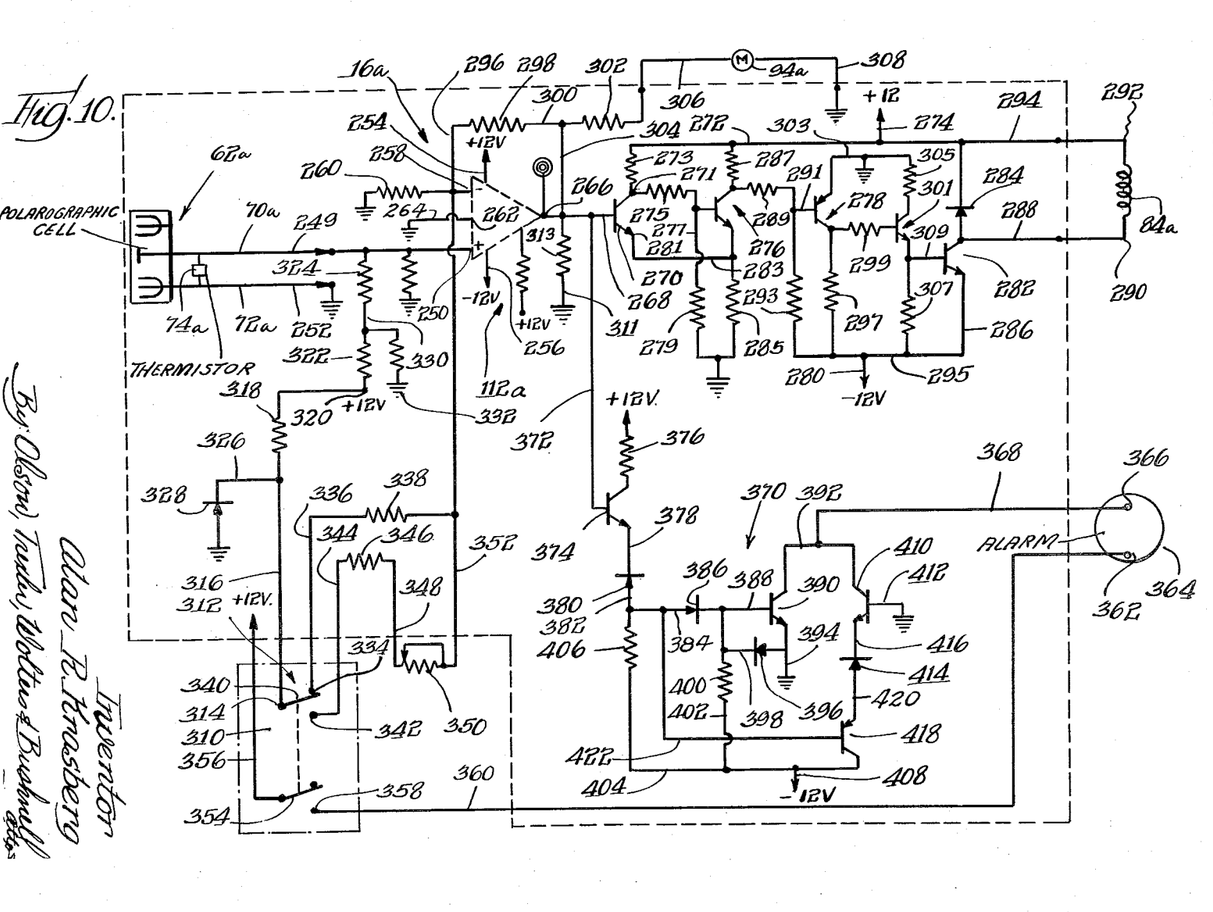
FIG. 10 is a schematic wiring diagram showing a control circuit which may be utilized in the apparatus of FIG. 7.

The apparatus 10a may include an electrochemical cell similar to the cell 62 described above and an electrical control circuit similar to that described above. However, FIG. 10 shows control means 16a which is more elaborate than the simplified circuit previously described. In this embodiment it is contemplated that the electrochemical cell 62a is constructed so as to be self-biasing so that a battery need not be connected to the cell in the manner disclosed in the previous embodiment. In order to make the electrochemical cell 62a, the anode may, for example, be formed from cadmium while the cathode may be formed, for example, from gold. Batteries 247 and 249 are mounted as shown in FIGS. 8 and 9 for supplying the power for the control circuit 16a and are suitably connected to the circuit.

The terminal 70a of the sensing device 62a is connected with an input terminal 250 of an operational amplifier 112a and the sensing device terminal 72a is connected by wire 252 to ground. The amplifier 112a is connected by a wire 254 with a plus 12 volt bias and by a wire 256 with a minus 12 volt bias. A terminal 258 of the amplifier is connected through resistor 260 to ground and another terminal 262 is connected by a wire 264 to ground. An output terminal 266 is connected by wire 268 to a transistor amplifier stage 270 which has a terminal 271 connected by resistor 273 and wires 272 and 274 to a plus 12 volt bias. The terminal 271 is also connected through resistor 275 and wire 277 to a transistor amplifier stage 276 and through resistor 279 to ground.

A terminal 281 of the amplifier stage 270 is connected with a terminal of transistor amplifier stage 276 by wire 283 which is also connected with ground through resistor 285. Another terminal of transistor 276 is connected through resistor 287 to wire 272 and through resistor 289 and wire 291 to another transistor amplifier stage 278. The wire 291 is connected through resistor 293 with wire 295 which is connected through wire 280 with a minus 12 volt bias. A terminal of transistor 278 is also connected with wire 295 through resistor 297. This terminal is also connected through resistor 299 to a further amplifier transistor 301. Another terminal of transistor 278 is connected by wire 303 to ground and through resistor 305 to a terminal of transistor 301. Another terminal of transistor 301 is connected through resistor 307 to the wire 295 and through wire 309 to a switching transistor 282 which has one terminal connected through diode 284 with wire 294. The switching transistor 282 has another terminal connected with a minus 12 volt bias by wire 286 and the first mentioned terminal connected by wire 288 with a terminal 290 of the solenoid valve 84a. The solenoid valve has its opposite terminal 292 connected with the plus 12 volt bias by a wire 294.

The solenoid 84a is resiliently or otherwise biased to a normally open position for permitting oxygen to flow from the supply tank into the system. The portion of the control circuit 16a previously described functions so that an electrical signal is provided by the self-biasing electrochemical cell or polarographic electrode sensing device 62a in response to the presence of oxygen in the system and when the oxygen content has risen to a predetermined level and the electrical output signal of the sensing device has thus risen to a predetermined level, the solenoid valve 84a is energized so as to close the valve.

The amplifier 112a has its terminal 258 connected by a wire 296 to a resistor 298 which in turn is connected by a wire 300 to a resistor 302 and by wire 304 with the terminal 266 of the amplifier. The resistor 302 is connected by wire 306 with one terminal of the meter 94a which has its other terminal connected to ground by a wire 308. The terminal 266 is also connected to ground through wire 311 and resistor 313.

The control circuit also includes a pressure operated range switch circuit. More specifically, a two-position range switch 310 having a float, bellows or other pressure operated means 312 is provided. The switch has one terminal 314 connected by a wire 316 and resistor 318 to a point 320 which in turn is connected with a plus 12 volt bias and is also connected through resistors 322 and 324 with wire 249. The wire 316 is connected by a wire 326 and diode 328 to ground and a wire 330 between the resistors 324 and 326 is connected through another resistor 332 to ground. The switch 310 has another terminal 334 connected by wire 336 and a resistor 338 to the terminal 258 of the amplifier 112a. The structure of the switch 310 is such that a movable contact 340 normally connects contacts 312 and 334 when the switch is under normal or sea level pressure. When, however, the switch is under a substantially increased pressure such as when a diver descends to a predetermined depth which may, by way of example, be about 30 feet, the switch functions to shift the element 340 from the contact 334 to another contact 342. The contact 342 is connected by a wire 344 with a resistor 346 which in turn is connected by wire 348, a variable resistor 350 and wire 352 with the terminal 258 of the amplifier.

The pressure switch includes a second movable contact element 354 connected with a plus 12 volt bias wire 356. The element 354 is adapted to be shifted in unison with the element 340 into and out of engagement with a contact 358 which in turn is connected by wire 360 with one contact 362 of an alarm device 364. The device 364 may be in the form of an electric light or an alarm bell or both. An opposite contact 366 of the alarm device is connected by wire 368 with an alarm driver portion 370 of the circuit.

The alarm driver portion 370 of the circuit is connected by a wire 372 and wire 268 with the output of the amplifier 112a. The wire 372 is connected with an amplifying transistor 374 having one contact connected through resistor 376 with a plus 12 volt bias. Another contact of the transistor 374 is connected by wire 378 with a diode 380 which is connected through wires 382 and 384 with a diode 386 which in turn is connected by a wire 388 with a transistor 390 having one contact connected by wires 392 and 368 with the alarm device and another contact connected by a wire 394 to ground and also to the diode 396. The diode 396 is connected by a wire 398 with a resistor 400 which is connected between the wire 388 and a wire 404 which in turn is connected with the wire 382 to a resistor 406 and with wire 408 connected to a minus 12 volt bias.

Wire 392 has a branch extending to a transistor 410 which is connected to ground by a wire 412 and also to a diode 414 by a wire 416. The diode is in turn connected with a transistor 418 which is connected by a wire 420 to the minus 12 volt bias and by a wire 422 to the previously described wire 384. The circuitry for the alarm device 364 is such that when the system is subjected to a predetermined relatively low pressure such as when a diver is at the surface of the water, the switch 310 is in the position shown in FIG. 10 so that the contact 354 is in an open position and the alarm circuit is inoperative. However, when the diver descends to a predetermined level the pressure switch 310 functions to shift the contacts 340 and 352 for engagement with the contacts 342 and 358 respectively and the alarm circuit is closed so that the device 364 will be energized whenever the oxygen content in the gas is being monitored falls below a predetermined level and thus the electric signal put out by the sensing device 62a falls below a predetermined value.

While preferred forms of the present invention have been shown and described herein, it is obvious that many details may be changed without departing from the spirit and scope of the appended claims.

The invention is claimed as follows:

1. A system for maintaining a life sustaining atmosphere comprising means communicative with a breather for providing a gas to be breathed, means connected with said first mentioned means for supplying oxygen to said first mentioned means, a polarographic electrode comprising electrolyte and an anode and a cathode immersed in said electrolyte communicating wtih said first mentioned means for sensing the presence of oxygen in accordance with the partial pressure resulting from the oxygen in the gas within said first mentioned means, said electrode including an oxygen permeable membrane confining said electrolyte, and means responsive to an electrical signal provided by said electrode in response to the presence of oxygen for controlling the flow of oxygen from said oxygen supplying means to said first mentioned means.

2. A system, as defined in claim 1, which includes means connected with said electrode and responsive to said electrical signal for providing an indication of the presence of oxygen.

3. A system of the type described for maintaining a life sustaining atmosphere comprising means communicative with a breather and providing a substantially closed circuit for a gas to be breathed, means connected in said circuit for absorbing carbon dioxide from the gas, means connected with said circuit for supplying oxygen to said circuit, and a polarographic electrode comprising electrolyte and an anode and a cathode immersed in said electrolyte communicating with said circuit for sensing the presence of oxygen and providing an electrical signal in accordance with the partial pressure resulting from the oxygen within said circuit, and means responsive to said signal for indicating the presence of oxygen, said electrode including an oxygen permeable membrane confining said electrolyte.

4. An underwater breathing apparatus comprising means communicative with a breather and providing a substantially closed circuit for a gas mixture to be breathed, means connected in said circuit for removing carbon dioxide from the gas mixture, means connected with said circuit for supplying oxygen to said circuit, additional means connected with said circuit for supplying a neutral gas to said circuit and means for controlling the flow of oxygen from said oxygen supplying means to said circuit including polarographic electrode comprising electrolyte and an anode and a cathode immersed in said electrolyte exposed to the gas mixture within said circuit and responsive to the presence of oxygen in accordance with the partial pressure resulting from the oxygen in the gas mixture within said circuit, said electrode including an oxygen permeable membrane confining said electrolyte.

5. An apparatus, as defined in claim 4, which includes means connected between said oxygen supplying means and said circuit for permitting the flow of a predetermined minimum amount of oxygen independently of said control means.

6. A breathing apparatus comprising means communicative with a breather and providing a circuit for a gas mixture to be breathed, means connected in said circuit for removing carbon dioxide from the gas mixture, means connected with said circuit for supplying oxygen, additional means connected with said circuit for supplying a neutral gas, a polarographic electrode comprising electrolyte and an anode and a cathode immersed in said electrolyte communicating with the gas mixture within said circuit for providing an electrical signal in accordance with the partial gas pressure resulting from the oxygen in the gas mixture within said circuit said electrode including an oxygen permeable membrane confining said electrolyte, and means responsive to said signal for controlling the flow of oxygen from said oxygen supplying means to said circuit.

7. An apparatus, as defined in claim 6, wherein said means for controlling the flow of oxygen comprises a solenoid actuated valve, an electrical circuit including a source of power and a relay connected with the solenoid actuated valve, and amplifying means connected with said electrical signal providing electrode and with said relay for amplifying the signal and actuating the relay.

8. An apparatus, as defined in claim , which includes means connected with said signal providing electrode for producing a visual indication of the oxygen present in said gas mixture.

9. An apparatus, as defined in claim 8, which includes manually adjustable means for varying the flow of oxygen from said oxygen supply means to said circuit.

10. An underwater breathing apparatus adapted to be worn by a diver and comprising means providing a substantially closed circuit for a gas mixture to be breathed, said means including a first flexible breathing bag for a portion of the gas mixture to be inhaled and a second flexible breathing bag for a portion of the gas mixture which has been exhaled and means connected between said bags and communicative with the diver, said circuit providing means also including a canister connected between said bags and containing a material for absorbing carbon dioxide from the gas mixture, an oxygen supply tank connected with said circuit, a neutral gas supply tank connected with said circuit, valve means connected between said neutral gas supply tank and said circuit for permitting the flow of neutral gas into said circuit in accordance with the depth of a diver using the apparatus, and a polarographic electrode comprising electrolyte and an anode and a cathode immersed in said electrolyte connected in said circuit and responsive to the presence of oxygen in the gas mixture within said circuit for providing an electrical signal in accordance with the presence of oxygen in said circuit, and means responsive to said signal controlling the flow of oxygen into the circuit independently of the flow of said neutral gas into the circuit, said electrode including an oxygen permeable membrane confining said electrolyte.

11. A system for maintaining a respirable atmosphere comprising means communicative with a breather for providing a gas to be breathed, means connected with said first mentioned means for supplying oxygen to said first mentioned means, and polarographic electrochemical cell for providing an electrical signal proportion to an amount of oxygen supplied thereto, said cell comprising electrolyte and an anode and a cathode immersed in said electrolyte, said cell communicating with said first mentioned means for sensing the presence of oxygen in accordance with the partial pressure resulting from the oxygen in the gas within said first mentioned means, said cell including an oxygen permeable element confining said electrolyte, and means responsive to an electrical signal provided by said cell in response to the presence of oxygen for controlling the flow of oxygen from said oxygen supplying means to said first mentioned means.

12. An apparatus, as defined in claim 11, which includes a perforated gas diffusing member disposed within first mentioned means and connected with said oxygen supplying means for directing oxygen into first mentioned means in a plurality of separate streams and promoting mixing of the oxygen with gases in the first mentioned means.

13. An apparatus, as defined in claim 11 which includes means connected with said first mentioned means for supplying an inert gas, and means including an emergency valve between said oxygen supplying means and said inert gas supplying means and said first mentioned means and by-passing said oxygen flow controlling means, said emergency valve being manually operable for supplying inert gases and oxygen to first mentioned means in the event of failure of said oxygen flow controlling means.

14. An apparatus, as defined in claim 11, which includes means connected with said first mentioned means for supplying a first inert gas, additional means connected with first mentioned means for supplying a second inert gas, and selector valve means between said inert gas supplying means and said first mentioned means for selectively permitting flow of said first and second inert gases.

15. An apparatus, as defined in claim 11, which includes means connected with first mentioned means for supplying inert gas, and perforated gas diffusing means disposed in said first mentioned means and connected with said oxygen supplying means and said inert gas supplying means for directing the oxygen and inert gas into first mentioned means in the form of a plurality of separate streams and promoting mixing of the oxygen and inert gas with gases in the first mentioned means.

References Cited by the Examiner

UNITED STATES PATENTS

| | | | |
|---|---|---|---|
| 2,414,747 | 1/1947 | Kirschbaum | 128—142 |
| 2,764,152 | 9/1956 | Osterberg | 128—142 |
| 2,830,583 | 4/1958 | Finney | 128—142 |
| 2,906,262 | 9/1959 | Braunstein | 128—142 |
| 2,914,067 | 11/1959 | Meidenbauer | 128—142 |
| 2,915,059 | 12/1959 | LeMasson | 128—142 |
| 3,098,813 | 7/1963 | Beebe et al. | 128—21 X |

RICHARD A. GAUDET, *Primary Examiner.*

W. E. KAMM, *Assistant Examiner.*